(12) United States Patent
Mason, Jr. et al.

(10) Patent No.: US 6,557,079 B1
(45) Date of Patent: Apr. 29, 2003

(54) REMOTE DATA FACILITY PREFETCH

(75) Inventors: Robert S. Mason, Jr., Uxbridge, MA (US); Yuval Ofek, Framingham, MA (US); Dan Arnon, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/468,270

(22) Filed: Dec. 20, 1999

(51) Int. Cl.[7] ............................................. G06F 12/00
(52) U.S. Cl. ........................ 711/137; 711/114; 711/113
(58) Field of Search .............................. 711/137, 114, 711/113

(56) References Cited

U.S. PATENT DOCUMENTS

| 5,737,747 A | 4/1998 | Vishlitzky et al. ........... 711/118 |
| 5,742,792 A | 4/1998 | Yanai et al. ................. 711/162 |
| 5,761,464 A | 6/1998 | Hopkins ...................... 710/310 |
| 5,765,213 A | 6/1998 | Ofer .......................... 711/213 |
| 5,887,151 A | 3/1999 | Raz et al. .................... 712/206 |
| 6,003,114 A | 12/1999 | Bachmat ...................... 711/113 |
| 6,076,143 A * | 6/2000 | Blumenau ..................... 711/111 |

OTHER PUBLICATIONS

Ron White, "How Computers Work: Deluxe Edition", ZDPress, 1997; pp 86–87.*

* cited by examiner

*Primary Examiner*—Reginald G. Bragdon
(74) *Attorney, Agent, or Firm*—Daly, Crowley & Mofford, LLP

(57) ABSTRACT

A mechanism for optimizing predictive read performance in a data storage system that is connected to a geographically remote data storage system by a data link for remote replication of data in support of data recovery operations. The data storage system initiates a local prefetch and initiates via the data link a remote prefetch by the remote data storage system to retrieve data from storage devices coupled to the local and remote data storage systems, respectively. The remote prefetch read start address is offset from the local prefetch read start address by a programmable track offset value. The programmable track offset value is adjusted to tune the prefetch workload balance between the local and remote data storage systems.

16 Claims, 6 Drawing Sheets

REMOTE DATA FACILITY PREFETCH

BACKGROUND OF THE INVENTION

The invention relates generally to data storage systems, and in particular, to data storage systems with remote data mirroring capability.

Given the importance of the availability of information, several approaches have been developed for providing enhanced reliability and availability of data stored in a mass storage system in the event of system malfunction or destruction. In one technique, data is periodically backed up and archived on magnetic tape. While such periodic backup provides critical protection, data updated or modified since the last backup will not be protected. In addition, for large mass storage systems, this process is very time consuming and costly. If a failure or malfunction should occur, the time required to transfer data from tape to another mass storage system may be quite lengthy.

Another technique is data mirroring. In a "mirrored" system, the data stored on one mass storage subsystem is replicated on one or more other mass storage subsystems. Thus, if one or more storage devices on one of the mass storage systems fails, the data is available in the form of a mirrored copy from the mirrored system. Consequently, if a catastrophic system failure, such as a malfunction or complete destruction, should occur, the data is readily available from the mirrored system. Systems arranged in a mirrored configuration may be situated in close proximity to one another, e.g., in the same building, or may be geographically distant, e.g., within the same campus.

In such mirrored, fault-tolerant environments, one of the systems is typically a master and services both read and write requests. As is known in the art, the master system may employ a cache to increase performance. Maintaining a low cache miss rate is crucial to obtaining good performance. Thus, in addition to caching, the system may employ some type of "read ahead" control or data prefetching to reduce cache miss rates. Data prefetch involves the staging, in the cache, of data before the data is referenced by the host. Any prefetch mechanism therefore requires address prediction, that is, predicting the address of data that will be referenced by the host, and control to ensure that the prefetch is timed so that the prefetched data is available (in cache) to the host when needed.

Various types of data prefetching techniques have been developed to boost cache performance, for example, spatial prefetch and temporal prefetch. Spatial prefetching is based on the likelihood that once data is referenced, nearby data is also likely to be referenced. In a spatial prefetch, the decision to prefetch is determined by the current cache access, e.g., fetching the cache block adjacent to the cache block currently being accessed. In temporally prefetching methods, prefetches are issued by examining the instructions ahead in the instruction stream, including past branches, and predicting the addresses that will be used by future instructions. Yet another type of prefetch is the history-based prefetch, which predicts memory access patterns based on past memory usage.

Individual systems in mirrored, fault tolerant configurations can also each use mirroring and dynamic mirror service policies to effectively improve system reliability and dynamically balance loading among storage devices as well as the intelligent controllers that control them. In contrast, prefetch burden allocation is either fixed or only slowly adjustable.

Unlike the master system, which executes both host-requested reads and writes, the other "slave" system, if it is connected to a host computer, can support host-requested reads only. Additionally, the slave system provides fault tolerant capability and thus, with respect to the master system, services mostly write requests for storing data copies. To ensure that the slave system's cache is not underutilized, the master data storage system can enable the slave data storage system to prefetch chunks of data into the slave data storage system's own cache during timed intervals, for subsequent use by the master storage system in support of host-requested reads, as described in U.S. Pat. No. 6,003,114, in the name of Eitan Bachmat. The bandwidth of the data link is therefore used during writes as required by data backup operations and only infrequently for reads to support data recovery operations or local cache misses.

SUMMARY OF THE INVENTION

This invention relates to a technique for performing a prefetch operation on data being maintained by a data storage system and a remote data storage system arranged in a mirrored configuration and interconnected by a data link.

In one aspect of the invention, a local prefetch operation directed to data on a local mirrored copy of the data storage system is initiated and a read command is sent to the remote data storage system over the data link. The read command causes the remote data storage system to provide other data prefetched from a remote mirrored copy of the remote data storage system to the data storage system over the data link.

Embodiments of the invention may include one or more of the following features.

The local prefetch operation can begin at a first address of a first track number in a range of consecutive prefetch addresses and the read command can be directed to a second address of a second track number in the range of consecutive track prefetch addresses.

The read command can cause the remote data storage system to initiate a remote prefetch operation directed to a corresponding remote mirrored copy on the corresponding remote data storage system.

The second track number can be offset from the first track number by a programmable track offset value.

The data storage system can include a cache memory for storing data and a cache directory for storing metadata, the metadata including a prefetch flag for indicating that data was retrieved by the local prefetch operation and a remote prefetch flag for indicating that data was retrieved by the remote prefetch operation.

The data retrieved by the local prefetch operation can be stored in the cache memory and the prefetch flag set to indicate that the data was retrieved by the local prefetch operation.

The requested, other data from the remote data storage system can be received over the data link, and, if it is determined that the other data is not stored in the cache memory, the other data can be stored in the cache memory and the remote prefetch flag can be set to indicate that the other data was retrieved by the remote prefetch operation. If it is determined that the other data is stored in the cache memory and was retrieved by the local prefetch operation, the programmable track offset value is increased by a programmable adjustment value. The other data received over the data link is discarded.

If it is determined that data has been requested already by the remote prefetch operation, and the remote prefetch flag is determined to be set, then a remote count is increased by one and compared to a predetermined threshold value. If the comparison indicates that the remote count equals the predetermined threshold value, then the programmable track offset value is decreased by the programmable adjustment value.

The programmable track offset value can be adjusted to compensate for a workload imbalance between the data storage system and the remote data storage system.

The present invention therefore provides a data storage system which reads from a remote backup data storage system as part of a predictive prefetch operation. This type of prefetch mechanism significantly improves controller read performance by allowing multiple parallel prefetch streams to serve one data request. It also provides for dynamic tuning of data streams and reduced loading of back-end interfaces by using "free" data link bandwidth.

BRIEF DESCRIPTION OF THE DRAWINGS

Other features and advantages of the invention will be apparent from the following description taken together with the drawings in which.

DETAILED DESCRIPTION

The present invention features a system in which data identical to that stored on a data storage system is stored on a geographically remote (or simply, remote) data storage system. The phrase "geographically remote," as used herein, means not within the same building. The remote data storage system, primarily used to backup data stored on the data storage system and provide data recovery when the data storage system and its data are lost as a result of malfunction or disaster, also assists the data storage system in performing data prefetch operations.

Figure 1:
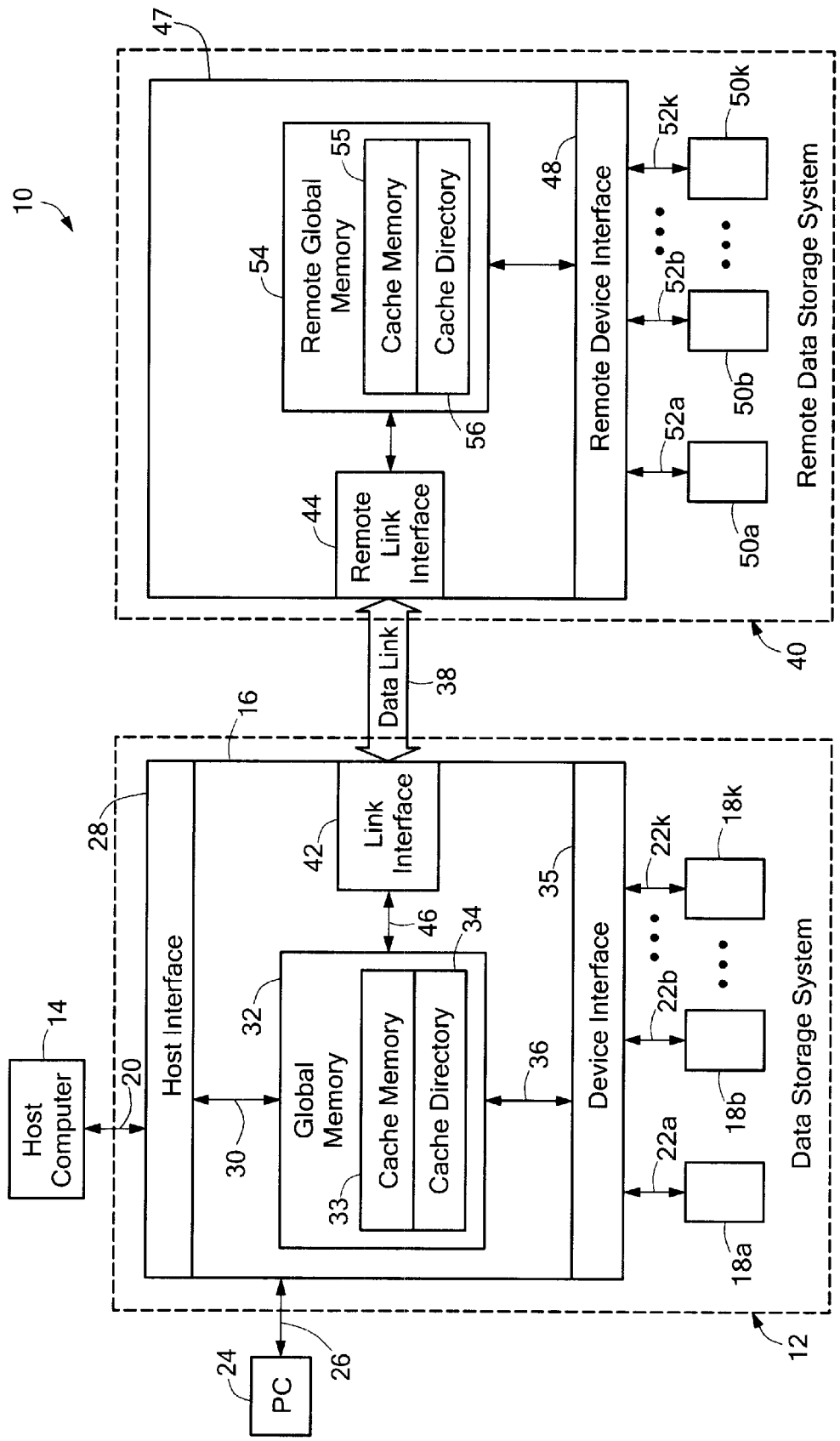
FIG. 1 is a block diagram of a system with remote data mirroring, the system including a data storage system coupled to a remote data storage system by a data link in a fault tolerant, mirrored configuration.

Referring to FIG. 1, a system 10 includes a data storage system 12 connected to at least one host computer 14. The host computer 14 may be, for example, a personal computer, workstation, or the like which may be used by a single user, or a multi-user system. The data storage system 12 receives data and commands from, and delivers data responses to, the host computer 14.

The data storage system 12 is a mass storage system having a controller 16 coupled to one or more storage devices, such as disk storage devices 18a, 18b, . . . , 18k. The controller 16 interconnects the host computer 14 and the storage devices 18, and can be, for example, that made by EMC® Corporation and known as the Symmetrix® controller.

In a typical configuration, the controller 16 also connects to a console PC 24 through a connecting bus 26. Console PC 24 is used for maintenance and access to the controller 16 and can be employed to set parameters of the controller 16 as is well known in the art.

Typically, each of the storage devices 18 is configured to store logical volumes (or devices). There can be a plurality of logical volumes, for example 4, 8, or more logical volumes, on a physical device. In a configuration in which multiple copies of a logical volume are maintained, that is, in particular, where two copies of data are separately stored for a logical volume, it is said that mirrors are maintained. (There could be more than two mirrored copies. Typically, however, mirrored pairs are employed.) The controller 16 can then respond to a read request by reading from either of the copies stored in the storage devices 18. Mirroring may exist at both the logical volume and physical device level, or at the logical volume level only.

In operation, the host computer 14 sends, as required by the applications it is running, commands to the data storage system 12 requesting data stored in the logical volumes or providing data to be written to the logical volumes. Still referring to FIG. 1, the controller 12 includes a host interface 28 for facilitating communications with the host computer 14. The host computer 14 typically connects to a port of the host interface 28 over the SCSI host bus line 20. The host interface 28, in turn, connects over at least one system bus 30 to a global memory 32. The global memory 32 includes a cache memory 33 and associated cache directory 34. Also connected to the global memory system 32 is a device interface 35, which controls the storage devices 18. Thus, the host interface 28 communicates with the device interface 35 through the global memory 32. The device interface 35 communicates with the global memory 32 over at least one dedicated bus 36. During a write operation, the device interface 35 reads data stored in the global memory 32 by the host interface 28 and writes that data to the appropriate logical volumes. During a read operation and in response to a read command, the device interface 35 reads data from a logical volume and writes that data to the global memory 32 for later delivery by the host interface 28 to the requesting host 14.

The data storage system 12, in turn, is connected over a data link 38 to a geographically remote data storage system 40 which provides backup capability in the form of mirrored storage for the data stored in the data storage system 12. To connect to the data link 38, the data storage system 12 and the remote data storage system 40 are provided with a link interface 42 and a remote link interface 44, respectively. The link interface 42 communicates with the global memory 32 over an internal bus 46.

The data link 38 is preferably an IBM ESCON standard fiber-optic link. The ESCON fiber-optic link, with continuous optical fiber, can link the data storage system 12 to the remote data storage system 40 when the systems are spaced up to 3 kilometers apart. ESCON links can be extended by repeaters or interfaces to T3 or E3 circuits, as discussed in the U.S. Pat. No. 5,742,792, in the name of Yanai et al., incorporated herein by reference.

The remote data storage system 40 is generally similar to the data storage system 12. In the embodiment depicted in FIG. 1, the remote data storage system 40 does not connect to host computers, and thus does not need a host interface. The remote data storage system 40 does, however, include a controller 47 having a remote device interface 48, remote physical devices 50a, 50b, . . . , 50k, each of which is coupled to the remote device interface 48 by a corresponding SCSI device bus 52a, 52b, . . . , 52k. The remote controller 47 further includes a remote global memory 54 having a remote cache memory 55 and associated remote cache directory 56. Typically, these components are identical to their counterparts in the data storage system 12, as described above. The remote link interface 44 enables the remote data storage system 40 to communicate with the data storage system 12. The remote storage devices 50 store a copy of the information stored in the storage devices 18 of the data storage system 12 in a mirrored manner.

It will be understood that the system 10 need not be limited to one host computer as shown. For instance the data storage system 12 could be coupled to more than one host computer. Additionally, or alternatively, the remote data storage system 40 could be coupled to one or more host computers for read operations, and thus would also include a host interface like host interface 28. Also, the host interface 28 can include a plurality of host adapters, each supporting a different host bus/host computer, and the device interfaces 35, 48 can include a plurality of disk adapters, each controlling one or more of the storage devices 18, 50, respectively.

Figure 2:
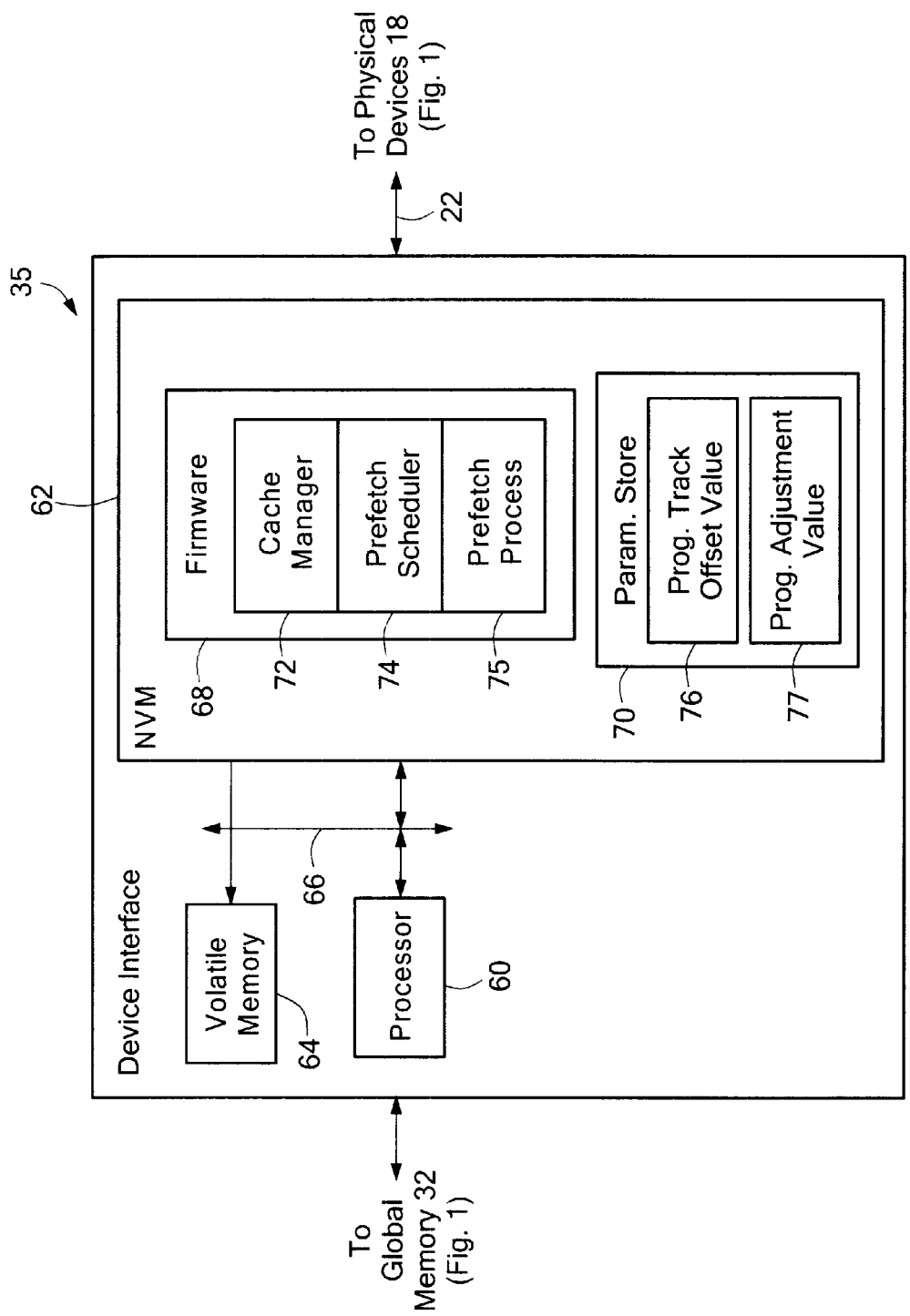
FIG. 2 is a block diagram of the global memory of the data storage system shown in FIG. 1.

Referring to FIG. 2, the device interface 35 includes a processor 60 coupled to a local, nonvolatile memory (NVM) 62 and a volatile memory (e.g., RAM) 64 by an internal bus 66. The processor 60 controls the overall operations of the device interface 35 and communications with the local memories 62, 64. The nonvolatile memory stores firmware 68 and parameter data in a parameter store 70. The firmware 68 includes a number of processes executed by the processor 60 of the device interface 35 to control data transfer between the host computer 14, the global memory 32 and the storage devices 18. Included as components of the firmware 68 are a cache manager 72, which includes routines for accessing the cache memory 33 and associated directory 34, a prefetch scheduler 74 and a remote-assisted prefetch process 75, as will be described. The parameter data of the parameter store 70 includes, among other information, a programmable track offset value ("X") 76 and a programmable adjustment value ("R") 77, both of which are used by the remote-assisted prefetch process 75. The firmware 68 and parameter store 70 are read each time the data storage system is initialized. The firmware 68 is copied to the volatile memory 64 at initialization time for subsequent execution by the processor 60.

The prefetch scheduler 74 performs prefetch address prediction and control, and may be implemented as any conventional sequential prefetch mechanism. In the preferred embodiment, the prefetch scheduler schedules a prefetch when the following conditions are met: 1) a cache miss has occurred and the previous record resides in cache memory; 2) all tracks in the "tail" (some number, e.g., 4, of most recent I/O requests) must be stored in the cache memory; and 3) for "CKD" (count-key-data) format only, all records for the last track in the tail must be stored in the cache memory. If these conditions are satisfied, the prefetch scheduler causes the device interface to perform a prefetch operation and ensures that the prefetch requests remain at least two tracks ahead of the host requests. The prefetch operation continues until no further host requests are pending. Additional details of prefetch techniques are provided in the following: U.S. Pat. No. 5,765,213, in the name of Ofer; U.S. Pat. No. 5,561,464, in the name of Hopkins; U.S. Pat. No. 5,737,747, in the name of Vishlitzky et al.; U.S. Pat. No. 5,887,151, in the name of Raz et al.; all of which are incorporated herein by reference.

Although not shown, each of the other interfaces uses cache manager routines 72 like those of the device interface 35 to access the cache memory 33 and cache directory 34 and that software is embedded in the respective interfaces themselves, as shown and described in the U.S. Pat. No. 6,003,114, incorporated herein by reference.

Referring back to FIG. 1, the cache memory 33 operates as a cache buffer in connection with storage and retrieval operations, in particular caching update information provided by the host interface 28 during a storage operation and information received from the storage devices 18 which may be retrieved by the host interface 28 during a retrieval operation. The cache directory 34 is used to store metadata associated with the cached data stored in the cache memory 33.

Figure 3:
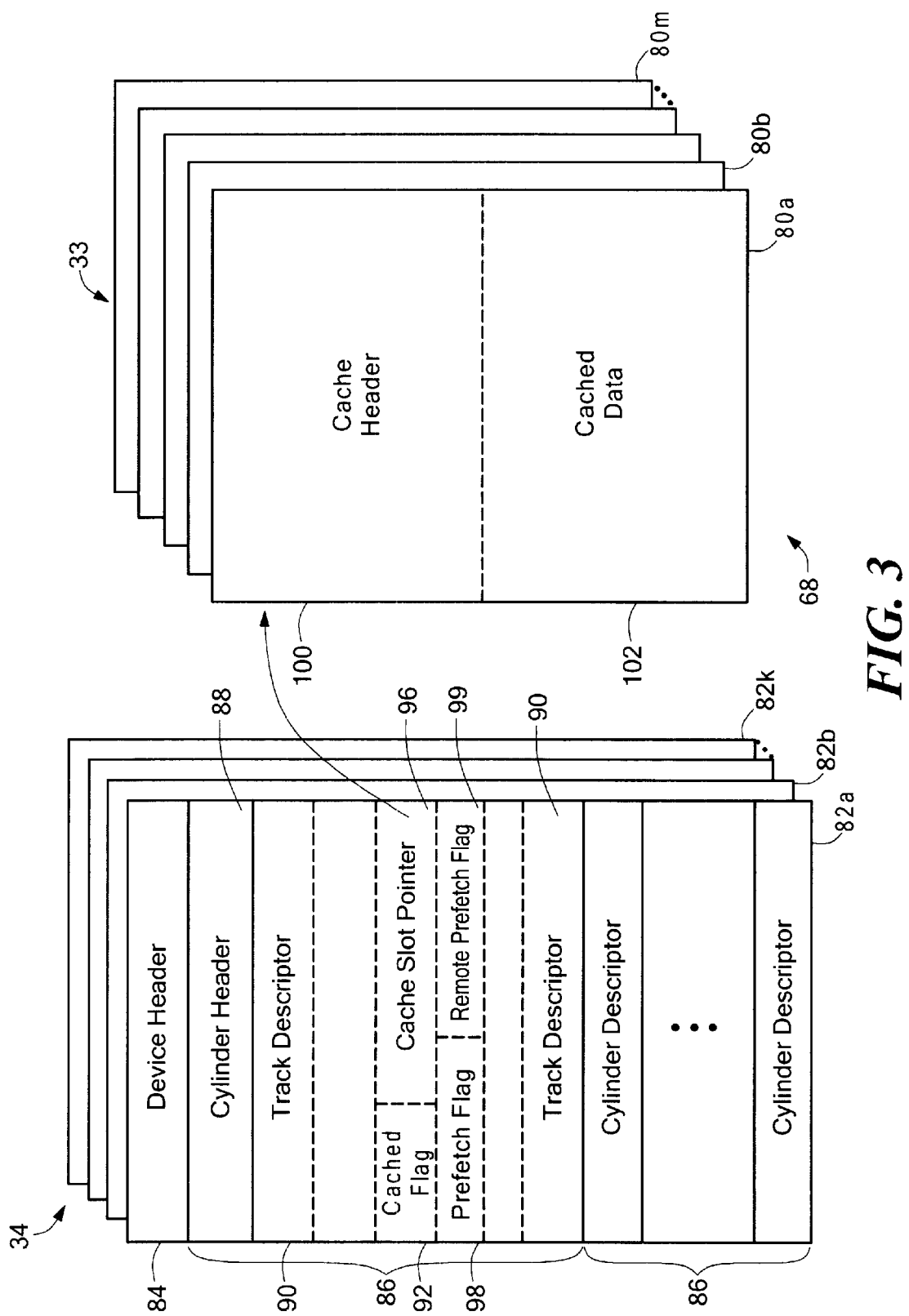
FIG. 3 is an illustration of the cache memory and cache directory in the global memory of FIGS. 1 and 2.

The cache memory 33 and cache directory 34 are described in further detail in connection with FIG. 3. With reference to FIG. 3, the cache memory 33 includes a plurality of storage locations, which are organized in a series of cache slots 80a through 80m (generally identified by reference numeral 80). The cache slots 80 provide the cache buffering for the information stored in global memory 32 as described above.

The cache directory 34 operates as an index for the cache slots 80 in the cache memory 33. The cache directory 34 includes cache index tables 82a through 82k (generally identified by reference numeral 82), each of which is associated with one of the storage devices 18a, 18b, 18k, in the data storage system 12. Each cache index table 82 includes a device header field 84, which provides, for example, selected identification and status information for the storage device 18 associated with the table. In addition, each cache index table 82 includes cylinder descriptors 86, each of which is associated with one of the cylinders in the storage device 18 with which the cache index table 82 is associated. Each cylinder description 86, in turn, includes a cylinder header 88, which provides, for example, selected identification and status information for the cylinder associated with the cylinder descriptor 86.

Each cylinder descriptor 86 includes track descriptors 90 for each track in the cylinder. Each track descriptor 90 includes information for the associated track of the storage device, including whether the track is associated with a cache slot 80, and, if so, an identification of the cache slot with which the track is associated. In the preferred embodiment, each track descriptor 90 includes a cached (local) flag 92, and a cache slot pointer 96. The cached flag 92, if set, indicates that the track associated with the track descriptor is associated with a cache slot 80. If the cached flag is set, the cache slot pointer 96 points to one of the cache slots 80, thereby associating the track with the respective cache slot 80. If the cached flag is set, information from the track is cached in the cache slot 80 identified by the cache slot pointer 96 for retrieval by the host interface 28 and updated information can be stored by the host interface 28 in the cache slot 80 for later storage on the associated track storage. The track descriptor 90 further includes a prefetch flag 98 and a remote prefetch flag 99, which will be described later. The track descriptor 90 may also include other status and control information (not shown).

Each cache slot 80 includes a cache header 100 and a cached data portion 102. Generally, the cached data portion 102 contains data that is cached in the cache slot 80 for the track that is associated with the cache slot. The header portion 100 generally contains data concerning the cache slot 80, including maintenance information, track identification and slot address.

As described above, and referring back to FIGS. 1 and 2, the host interface 28 typically performs storage (or write)

and retrieval (or read) operations in connection with information that has been cached in the cache memory 33, and the device interface 35 performs operations to transfer information in the storage devices 18 to the cache memory 33 for buffering and to transfer information from the cache memory 33 to the storage devices 18 for storage.

Generally, the host interface 28, during a read operation, attempts to retrieve the information for a particular track from the cache memory 33. However, if the condition of the cached flag associated with that track indicates that the information is not in the cache memory 33, it will enable the device interface 35 which controls the storage device 18 that contains the information to retrieve the information from the track which contains it and transfer the information into one of the cache slots 80 in the cache memory 3. Once the device interface 35 has performed this operation, it updates the track descriptor to indicate that the information from the track resides in the cache slot, in particular, setting the cached flag 92 and loading a pointer to the cache slot in the cache slot pointer 96. On the other hand, if the cached flag 92 indicates that the information is cached, the host interface 28 uses the cache slot pointer 96 to identify the cache slot 80 in which the information is stored.

After the device interface 35 has stored the data in the cache memory 33, it notifies the host interface 28. At some point after receiving the notification, the host interface 28 uses the cache directory 34 to identify the appropriate cache slot and retrieves the requested data from that cache slot.

During a write operation, the host interface 28 determines if information from a track to be written is cached in a cache slot. If cached, the host interface updates the cache slot with new data. If the host interface 28 determines that the track is not associated with a cache slot, it selects a cache slot, stores the new data in the selected cache slot and updates the track descriptor. Once the new data is stored in the cache slot, the host interface 28 notifies the device interface 35 so that the device interface 35 can write the data cached in the cache slot to the track and storage device with which the cache slot is associated.

As noted above, the remote data storage system 40 stores in the remote storage devices 50 a copy of the information stored in the storage devices 18 of the data storage system 12 in a mirrored manner. To accomplish the mirroring, when the host interface 28 in the data storage system 12 performs a storage operation to store update data for a particular track in the cache memory 68 of the global memory 32, it queues a storage request for the same update to the link interface 42, which transfers the storage request over the data link 38 to the remote data storage system 12. In response to the storage request received at the remote link interface 44, the remote data storage system's remote device interface 48 performs a corresponding storage operation in connection with the remote data storage system 40 to enable the updated information to be stored in the remote data storage system's cache memory of the remote global memory 54. At some point later, both of the systems 12, 40 transfer the update information to the appropriate storage devices 18, 50, respectively. The remote data mirroring facility and recovery procedures may be performed using known techniques, such as those described in the above-referenced U.S. Pat. No. 5,742,792.

Generally, a data storage system such as the remote data storage system 40 is used primarily to perform writes in connection with write requests received from the data storage system 12 so that updated information stored by the host interface 28 on the data storage system 12 is also stored on the remote data storage system 40, thereby maintaining the information stored in the data storage system 12 in a mirrored condition on the remote data storage system 40. Since write operations are normally performed at a much lower rate than read operations, the data link 38 is not otherwise extensively used.

Figure 4A:
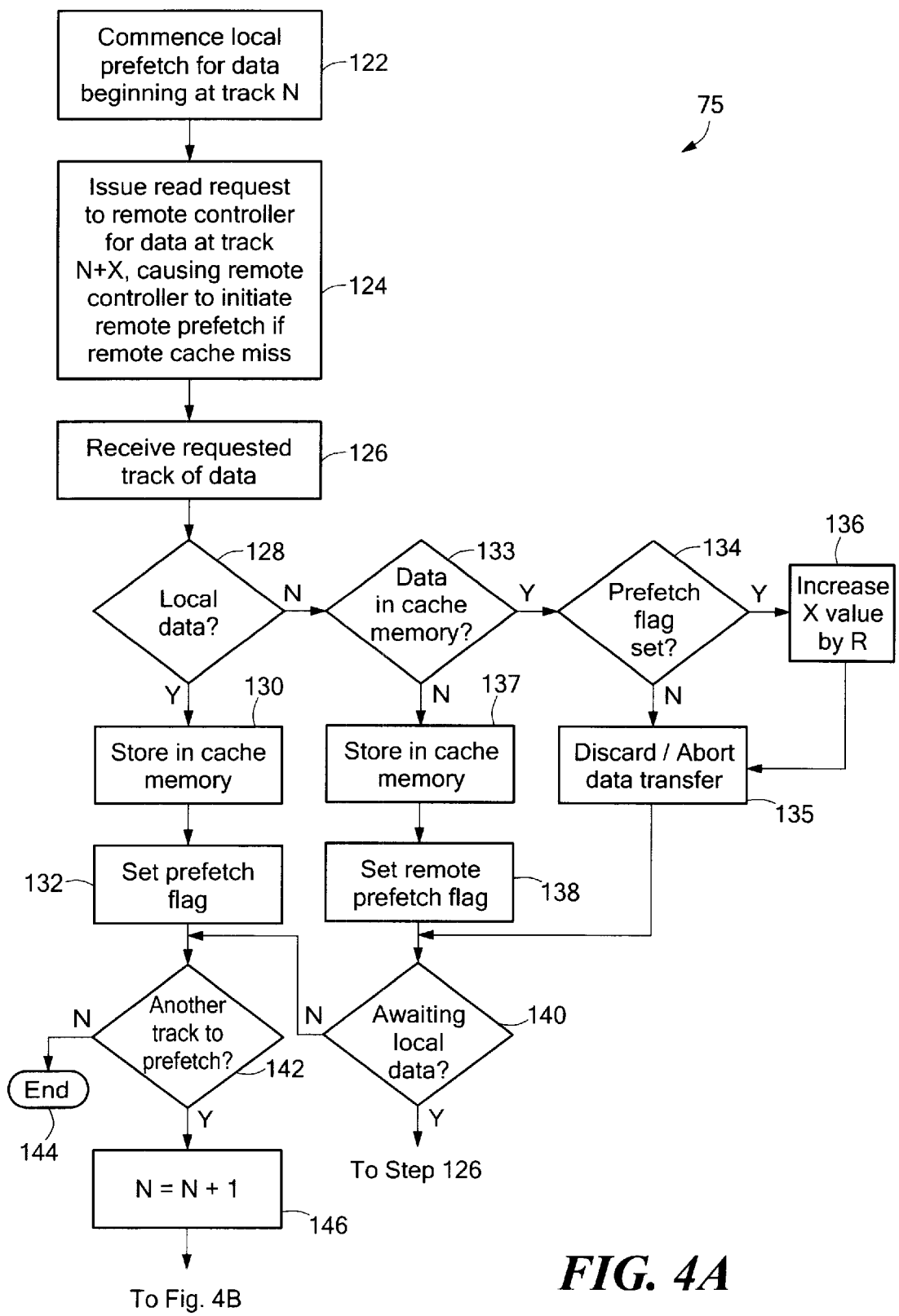
FIGS. 4A and 4B are first and second portions, respectively, of a flow diagram of a prefetch operation performed by the data storage system, with assistance from the remote data storage system as the bandwidth of the data link allows.

In accordance with the invention, therefore, the remote data storage system 40 is used to prefetch data as part of a prefetch operation being performed by the data storage system 12. Referring to FIG. 4A, the remote-assisted prefetch process (i.e., a prefetch process with remote data facility "assist") 75 of the device interface 35, begins when the device interface 35 receives a host I/O read request notification (in the case of a cache miss) from the prefetch scheduler 74, which detects the occurrence of prefetch conditions (as described above) and subsequently monitors via the host interface the rate at which the host computer consumes cached data. The host I/O read request command includes the address of a designated physical device and a designated track number N on that physical device. The process initiates a local prefetch operation beginning at a first address of the track number N in a range of consecutive designated prefetch addresses (step 122). The process also issues to the corresponding remote device interface 48 on the remote data storage system 40 a read request or command directed to a second address within the range of consecutive addresses, where the second address corresponds to a starting address on another track numbered N+X, where X is the predetermined, programmable track offset value (step 124). To the remote system, the command appears as if it has been sent by a host computer. In response to the read command and a remote prefetch determination by a remote prefetch scheduler in the remote global memory 54 that a prefetch operation should occur (e.g., a remote cache memory miss has occurred), the remote device interface 48 initiates a remote prefetch directed to a corresponding storage device 50. In the described embodiment, the value of X is selected to be 5.

Thus, while the device interface 35 begins prefetching data locally from track number N, the corresponding remote device interface 48 begins servicing that same prefetch request using a remote prefetch that is 5 tracks ahead of the local prefetch at track number N+5. Both prefetches are thus operating at the same time; however, the data prefetched at the remote data storage system 40 will be sent to the data storage system 12, preferably, a track at a time. Thus, once data associated with a requested track is received at the controller 16 of the data storage system 12 (step 126) and if the received data is locally generated or read data (step 128), the process loads the read track into the cache memory 33 (step 130) and sets a corresponding prefetch flag 92 in the associated track descriptor 90 in the cache directory 34 (step 132).

Referring back to step 128, if, however, the data originated from the remote data storage system 40, the process determines if the data for the track already resides in the cache memory 33 (step 133). If the data is already cached, then the process further determines if the data was retrieved by the (local) device interface 35 as indicated by a set prefetch flag (step 134). If the data was not brought into the cache memory by the device interface 35 as part of a local prefetch (i.e., the prefetch flag is not set), the process causes the link interface 42 to discard any data (such as header data) already received from the remote link interface 44 over the data link 38 and abort the data transfer (step 135). If, at step 134, it is determined that the prefetch flag is set, the process increases the programmable track offset value X by the programmable adjustment value R (step 136). Any data already received from the remote link interface 44 over the data link 38 is discarded and the data transfer aborted (step 135).

Referring back to step 133, if it is determined that the data is not in the cache memory, the process directs the transfer of the track in its entirety and stores the transferred track of data in a cache slot in the cache memory 33 (step 137). It also sets the remote prefetch flag associated with the appropriate device/track in the cache directory (step 138) (if the data is from the remote site, it will have been stored in the remote cache memory as well). After steps 135 and 138, the process determines if there remain any locally requested tracks outstanding (step 140). If so, the process waits to receive data (at step 126).

The process determines if another track is to be retrieved by the local prefetch (step 142). If not, the process terminates (step 144). If another track is to be read, the value of the track number N is incremented by one (step 146).

Figure 4B:
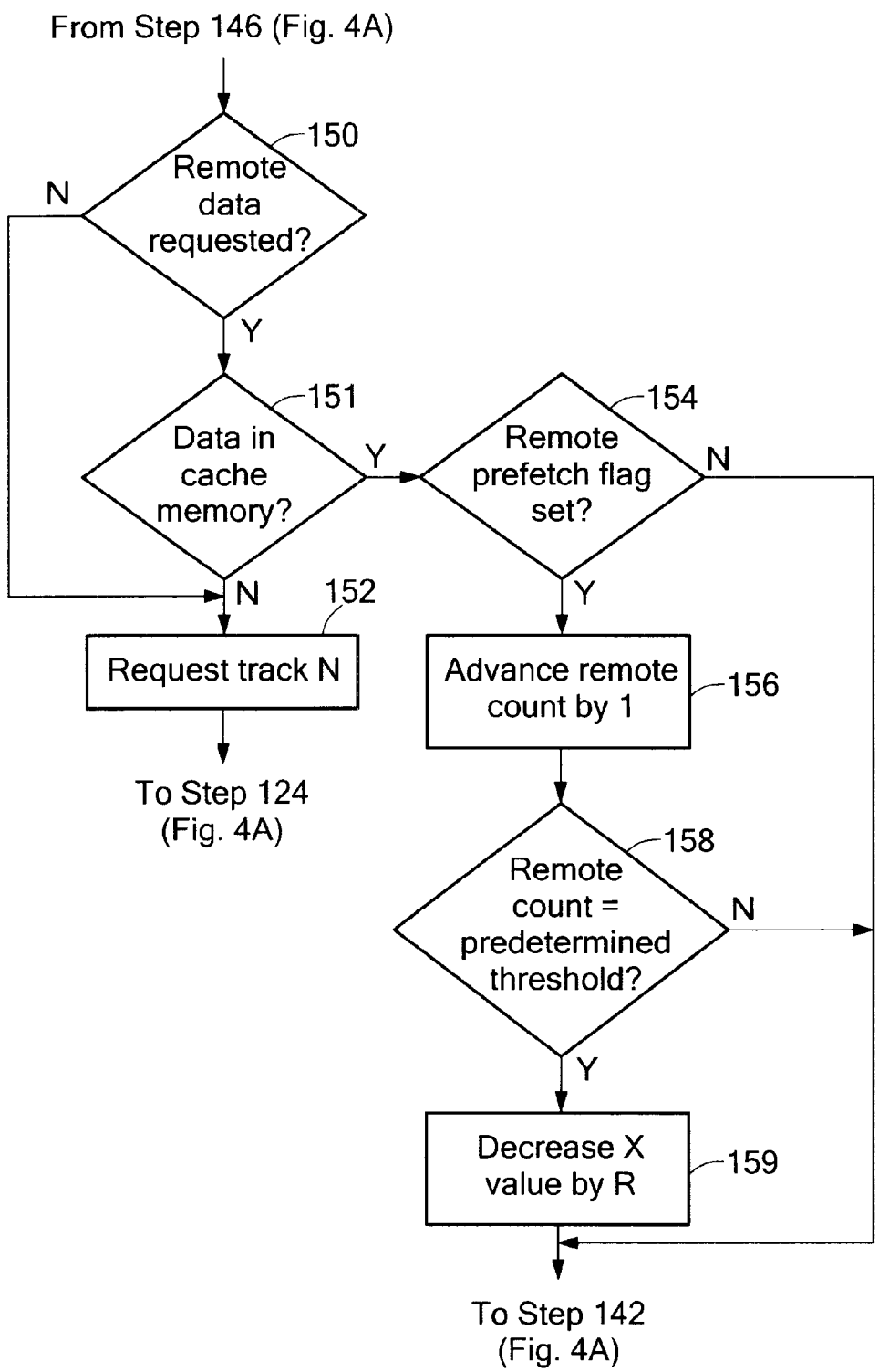

Referring to FIG. 4B, if it is determined that this new track (track number N, after step 146) was already requested from the remote data storage system (step 150), the process determines if the data is already stored in the cache memory (step 151). If the data does not reside in the cache memory, the process retrieves the new track N locally from a local storage device (step 152). Likewise, if it is determined that track was not previously requested from the remote data storage system (at step 150), the process retrieves the new track N from a local storage device (step 152).

Returning to step 124 (FIG. 4A), the process issues another read request directed to a track number N+X on a remote data storage device, which causes the remote data storage system to fetch the requested track from the remote cache memory, or, in the case of a remote cache memory miss, to initiate yet another remote prefetch operation.

If, at step 151, it is determined that the data is stored in the cache memory 33, the process determines if the remote prefetch flag is set (step 154). If it is determined that the remote prefetch flag is not set, the process returns to step 142 to process the next track number.

As indicated above, the value of X is increased each time the remote process is detected as being unsuccessful (i.e., when the local process brings in a remotely requested track before the remote process can do so, see step 134). To allow the remote process to become more successful, it may become necessary from time to time to reduce the value of X. Accordingly, the process maintains a remote count for counting the number of times that the remote controller of the remote data storage system is successful, i.e., the remote prefetch flag is determined to be set (at step 154).

The remote count is programmed to count to a predetermined "success" threshold value, e.g. 100. Thus, and with continued reference to FIG. 4B, if, at step 154, it is determined that the remote prefetch flag is set, the process advances the remote count by one (step 156) and compares the remote count to the threshold value (step 158). If the remote count is equal to the threshold value, the process decreases the X value by R (step 159) and returns to step 142 (FIG. 4A) to process the next track number. Consequently, the process skips any tracks for which the remote device interface 48 has already retrieved data. If the remote count is not equal to the threshold value, then the process proceeds directly to step 142 (FIG. 4A).

Other embodiments are contemplated. For example, it will be understood that other techniques for adjusting X may be used. For instance, X may be adjusted to maintain the workload balance in a desired ratio of local prefetched tracks to remote prefetched tracks. Also, the point in the process in which X is increased may be different. For example, X may be increased when the local prefetch has reached a remotely requested track that has not been stored in the cache memory as a result of the remote prefetch (e.g., between steps 151 and 152, and between steps 154 and 142, in FIG. 4B) instead of when the remote prefetch attempts to bring into the cache memory 33 data that was already retrieved by the local prefetch (step 136, as shown in FIG. 4A).

Figure 5:
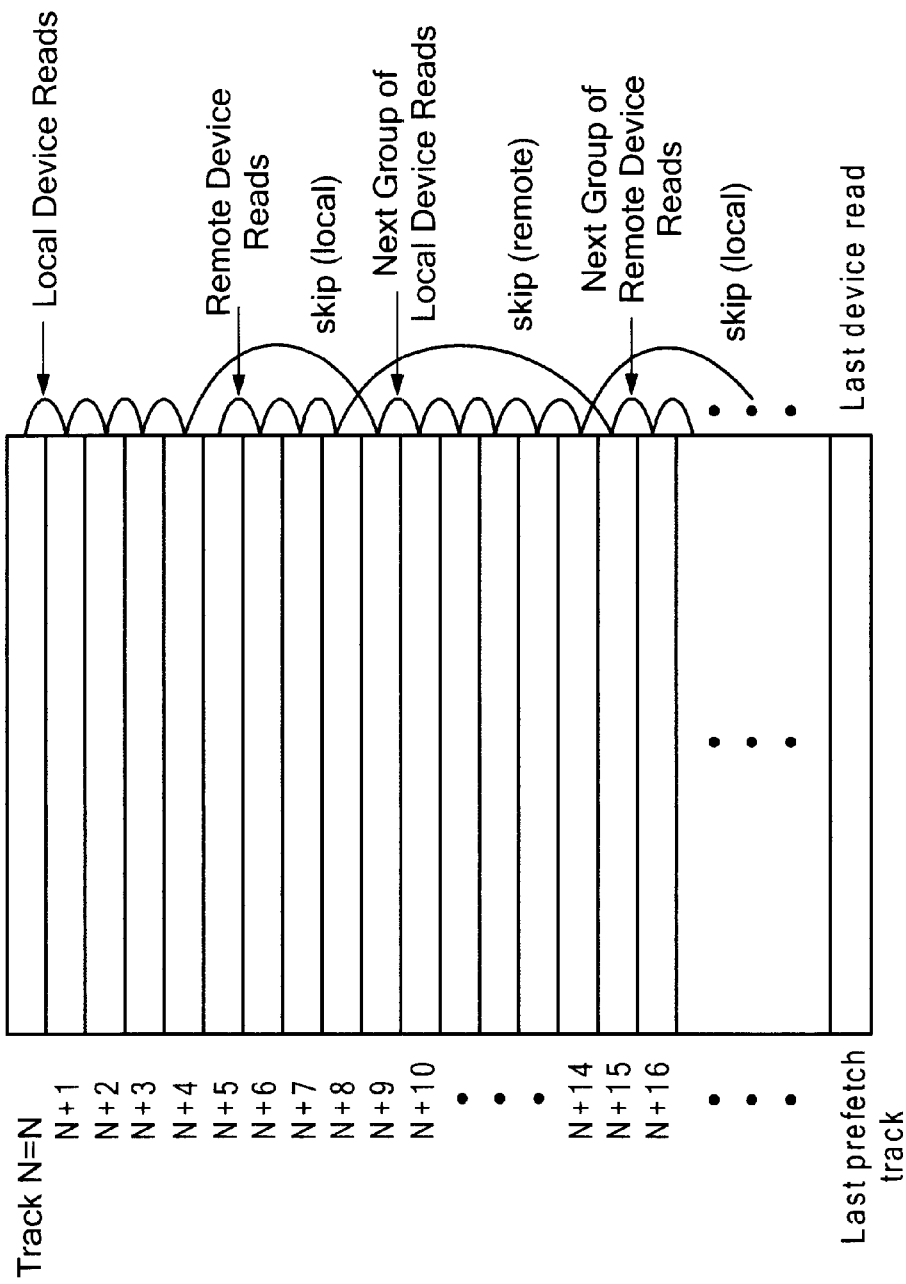
FIG. 5 is a depiction of a local prefetch stream including local and remote device reads.

FIG. 5 illustrates an exemplary local prefetch stream of both local and remote device reads. In this example, the initial value of the programmable track offset X is 5. As shown in the figure, the local prefetch from the local storage includes each consecutive track number N=N, N+1, N+2, N+3, N+4. At the same time, the local prefetch requests remotely each consecutive track number N+X=N+X, N+X+1, N+X+2, N+X+3, N+X+4. It is important to note that the local prefetch will request only one track remotely as it requests a single track locally. That is, track N+X is requested remotely when the local read for track N is initiated; track N+1+X is requested remotely only when the local read of track N+1 is initiated, and so forth. Thus, when the local prefetch reaches the remotely requested/read tracks (as identified by a set remote prefetch flag in associated metadata), it skips over them and resumes the next group of local reads where the remote reads have left off. It will be observed that, in this example, in the first group of reads, although the local prefetch has requested remote assistance with 5 tracks, it has received such assistance for only 4 of the 5 requested tracks. That is, track N+9 has not been cached in the cache memory as a result of a remote read by the time that the local prefetch reaches this track number. In response to the failure on the part of the remote data storage system, the value of X is increased by R=1 to give the remote data storage system (which may now be busy with higher priority tasks) more time to respond to subsequent track requests. Thus, the local prefetch local begins reading track N+9 (and, at the same time, making a remote request for N+9+(X+1), or, N+15), and finishes reading at track N+14 (at which time it makes a remote request for N+19). The remote data storage system eventually begins to transfer track N+9 over the data link, but the transfer is aborted as this particular track has already been retrieved locally (as indicated by the setting of the prefetch flag in associated metadata). The remote data storage system skips over tracks (in its own remote cache memory) corresponding to the next group of local device reads to service the next remote request at track N+15. The local prefetch skips over the next group of remote device reads (beginning at track N+15) in the same manner as described above, and resumes local device reads when it next encounters noncached tracks in the sequential stream. This process continues until the last track targeted for prefetching is read either locally or remotely.

Although the adjustment described above is performed by the device interface as the prefetch data is stored in the cache memory, it could instead be performed by the host interface as the cached data is consumed by the host computer. That is, the adjustment need only provide some means of dynamically re-allocating workload between the local and remote data storage systems based on how much prefetch assistance the controller 16 is actually receiving from its remote counterpart, the remote controller 47.

It will be understood that, relative to data mirroring writes and recovery reads, the remote prefetch is serviced as a lower priority (or background) task. Therefore, the device interface 35 can request assistance from the remote data storage system on prefetch operations, but will only receive the requested assistance when the data link and/or the remote data storage system is not busy storing mirrored data or retrieving mirrored data for data recovery or data migration purposes. Typically, while the remote data storage system first services higher priority requests, a pending read request from the device interface 35 will be queued at one or the other end of the data link. Even though the remote assist may not always be available, the data storage system 12 does not suffer performance-wise for lack of remote assistance and will experience some level of performance improvement based on the amount of remote assistance that data storage system 12 does receive from the remote data storage system 40.

It will be appreciated that numerous other modifications may be made in connection with the invention. For example, it will be appreciated that both data storage systems (local and remote) may perform operations described above for the respective data storage system 12 and remote data storage system 40. That is, if the data storage system identified by the reference numeral 40 performs the storage and retrieval operations in connection with host computers (not shown) connected thereto, and stores information used thereby, the data storage system identified by reference numeral 12 may perform mirrored storage in connection with information from the data storage system 40. In that case, if the data link is not heavily utilized, the data storage system 12 may be used to assist in the prefetch operation of the data storage system 40 in the manner described above.

Furthermore, although the invention has been described in connection with a mirrored pair of data storage systems, it will be appreciated that remote data storage system 40 could be coupled to yet another remote data storage system by a data link, possibly with additional "chaining" of remote data storage systems, each (while acting as a master) programmed to initiate its own "local" prefetch operation, which in turn, causes the neighboring slave/remote data storage system to do the same.

The controllers 16 and 47 may further support a mirror service policy which identifies which device adapters (in the device interface of a plurality of device adapters) in conjunction with the storage devices that they control are primarily responsible for satisfying requests from a host computer. This policy could be fixed at the beginning of a system set up, taking into account the expected loads. Preferably, however, the mirror service policy implementation is dynamic. That is, the mirror service policy can be modified, periodically, in response to statistics describing the nature of the read and write requests to the data storage system 12, to change the mirror service policy during the operation of the data storage system 12. An example of a dynamic mirror service policy (DMSP) is described in U.S. Pat. No. 6,112,257, as well as co-pending U.S. patent application Ser. No. 09/382,752, entitled "Dynamic Mirror Service Policy With Seek Adjustment in a Non-Physical Mirrored Storage Environment", in the name of Robert S. Mason, Jr., et al., both incorporated herein by reference.

In accordance with DMSP, and other similar techniques, all of which may include, for example, interleaved, mixed, dedicated, or other policies that appear to give the best average access time to data, a given host request directed to a particular logical volume which is mirrored on the logical, if not physical, device level, and thus stored on two storage devices as a mirrored pair, might be serviced by perhaps two disk adapters. Each disk adapter could initiate its own local prefetch to a copy (or mirror) and trigger (by read request, as described above) a remote prefetch to addresses within its local prefetch address range for the blocks that are serviced by that particular copy under the policy. Such an arrangement could result in multiple local and multiple remote prefetch streams, achieving a high degree of parallelism.

Each device interface 35, as well as each disk adapter in a device interface having a plurality of disk adapters, may be implemented as described with reference to FIG. 2.

Although not shown in FIG. 2, the parameter store 70 may also store as an input parameter a configuration parameter for selecting the remote-assisted prefetch option. Like the other input parameter data, this configuration parameter is user-programmable via the console PC 24 (FIG. 1). When the option is de-selected, the data link is not utilized for prefetch-related data communications between the linked data storage systems 12 and 40.

Additions, subtractions, and other modifications of the preferred embodiments of the invention will be apparent to those practiced in this field and are within the scope of the following claims.

What is claimed is:

1. A method for performing a prefetch operation on data being maintained by a data storage system and a remote data storage system arranged in a mirrored configuration and interconnected by a data link, comprising:

initiating a local prefetch operation directed to data on a local mirrored copy of the data storage system;

sending a read command to the remote data storage system over the data link, the read command causing the remote data storage system to provide other data prefetched from a remote mirrored copy of the remote data storage system to the data storage system over the data link; and wherein the local prefetch operation begins at a first address of a first track number in a range of consecutive prefetch addresses and the read command is directed to a second address of a second track number in the range of consecutive prefetch addresses, the second track number being offset from the first track number by a programmable track offset value.

2. The method of claim 1, wherein the read command causes the remote data storage system to initiate a remote prefetch operation directed to the remote mirrored copy on the remote data storage system.

3. A method for performing a prefetch operation on data being maintained by a data storage system and a remote data storage system arranged in a mirrored configuration and interconnected by a data link, comprising:

initiating a local prefetch operation directed to data on a local mirrored copy of the data storage system;

sending a read command to the remote data storage system over the data link, the read command causing the remote data storage system to provide other data prefetched from a remote mirrored copy of the remote data storage system to the data storage system over the data link; and wherein the data storage system includes a cache memory for storing data and a cache directory for storing metadata, the metadata including a prefetch flag for indicating that data was retrieved by the local prefetch operation and a remote prefetch flag for indicating that data was retrieved by the remote prefetch operation.

4. The method of claim 3, further comprising:

storing the data retrieved by the local prefetch operation in the cache memory.

5. The method of claim 3, further comprising:
setting the prefetch flag to indicate that the data was retrieved by the local prefetch operation.

6. The method of claim 5, further comprising:
receiving over the data link the prefetched other data from the remote data storage system.

7. The method of claim 6, further comprising:
determining whether or not the received other data is stored in the cache memory; and
if the received other data has not been stored in the cache memory, storing the received other data in the cache memory and setting the remote prefetch flag to indicate that the other data was retrieved by the remote prefetch operation.

8. The method of claim 7, wherein the local prefetch operation begins at a first address of a first track number in a range of consecutive prefetch addresses and the read command is directed to a second address of a second track number in the range of consecutive prefetch addresses, the second track number being offset from the first track number by a programmable track offset value, further comprising:
if the received other data is stored in the cache memory and has been retrieved by the local prefetch operation, increasing the programmable track offset value by a programmable adjustment value and discarding the received other data received over the data link.

9. The method of claim 7, further comprising:
detecting a workload imbalance between the data storage system and the remote data storage system.

10. The method of claim 9, further comprising:
adjusting the programmable track offset value in response to the detected workload imbalance.

11. The method of claim 3, further comprising:
determining if data has been requested already by the remote prefetch operation; and
if it is determined that the data has been requested already by the remote prefetch operation, determining if the remote prefetch flag is set.

12. The method of claim 11, further comprising:
if it is determined that the remote prefetch flag is set, then performing the steps of:
increasing a remote count by one;
comparing the remote count to a predetermined threshold value; and
if the remote count equals the predetermined threshold value, decreasing the programmable track offset value by the programmable adjustment value.

13. A storage controller for performing a prefetch operation directed to data stored on a storage device comprising:
a data link;
an interface for coupling the storage controller to a remote data storage system on the data link for mirroring the stored data, the interface requesting assistance from the remote data storage system in performing the prefetch operation;
a device interface coupled to the storage device, the device interface initiating a local prefetch operation directed to the stored data, the device interface causing the interface to send a read command to the remote data storage system over the data link, the read command causing the remote data storage system to provide other data prefetched from a remote mirrored copy in the remote data storage system to the device interface over the data link; and
wherein the prefetch operation at the storage controller begins at a first address of a first track number in a range of consecutive prefetch addresses and the read command is directed to a second address of a second track number in the range of consecutive prefetch addresses, the second address being offset from the first address by a programmable offset value.

14. The storage controller of claim 13, wherein the programmable offset value is adjusted to re-allocate workload between the device interface and the remote data storage system.

15. A storage controller for performing a prefetch operation directed to data stored on a storage device comprising:
a data link;
an interface for coupling the storage controller to a remote data storage system on the data link for mirroring the stored data, the interface requesting assistance from the remote data storage system in performing the prefetch operation;
a device interface coupled to the storage device, the device interface initiating a local prefetch operation directed to the stored data, the device interface causing the interface to send a read command to the remote data storage system over the data link, the read command causing the remote data storage system to provide other data prefetched from a remote mirrored copy in the remote data storage system to the device interface over the data link, the read command further causing the remote data storage system to initiate a remote prefetch operation directed to a corresponding remote mirrored copy on the remote data storage system;
a cache memory for storing data; and
a cache directory for storing metadata associated with the stored data, the metadata including a prefetch flag for indicating that the stored data was retrieved by the local prefetch operation and a remote prefetch flag for indicating that stored data was retrieved by the remote prefetch operation.

16. The storage controller of claim 15, wherein the device interface sets the prefetch flag in response to receiving data retrieved by the local prefetch operation and sets the remote prefetch flag in response to receiving data retrieved by the remote prefetch operation, and the device interface uses the prefetch and remote prefetch flags to determine if the workload should be re-allocated.

* * * * *

UNITED STATES PATENT AND TRADEMARK OFFICE
CERTIFICATE OF CORRECTION

PATENT NO. : 6,557,079 B1 Page 1 of 1
DATED : April 29, 2003
INVENTOR(S) : Robert S. Mason, Jr. et al.

It is certified that error appears in the above-identified patent and that said Letters Patent is hereby corrected as shown below:

Column 2,
Line 54, reads "requested, other" and should read -- requested other --.

Column 3,
Line 57, reads "data responses to," and should read -- data and responses to, --.

Column 6,
Line 25, reads "18a, 18b, 18k, and should read -- 18a, 18b, …, 18k, --.

Column 7,
Line 15, reads "memory 3." and should read -- memory 33. --.

Column 9,
Line 23, reads "if-data" and should read -- if data --.
Line 51, reads "The remote" (indented) and should read -- The remote -- (No indent)

Signed and Sealed this

Fifth Day of April, 2005

JON W. DUDAS
*Director of the United States Patent and Trademark Office*